UNITED STATES PATENT OFFICE.

CARL C. SCHIRM, OF BERLIN, GERMANY, ASSIGNOR OF ONE-HALF TO OTTO LESSING, OF SAME PLACE.

PROCESS OF PRODUCING CERAMIC COMPOSITIONS.

SPECIFICATION forming part of Letters Patent No. 609,907, dated August 30, 1898.

Application filed July 19, 1897. Serial No. 645,059. (No specimens.)

*To all whom it may concern:*

Be it known that I, CARL C. SCHIRM, a subject of the King of Prussia, German Emperor, and a resident of Berlin, in the Kingdom of Prussia, German Empire, have invented a certain new and useful Improvement in the Production of Ceramic Compositions, of which the following is a full, clear, and exact description.

The ceramic compositions hitherto known are not advantageous for producing finely-perforated delicate wares, such as figures and groups of figures and isolated ornaments, because they shrink when drying, and particularly while being fired, and are liable to break in consequence of the excessive contraction. In treating these compositions in molds the greatest care is necessary, and the molds must be very plain, otherwise the composition, which is very brittle when dried, will easily crumble. It has hitherto been quite impossible to cast the composition, as may be done with plaster-of-paris, a process which is very advantageous, owing to the artistic freedom it enables and to the great facilities it offers in manufacturing.

The present invention obviates the first-mentioned disadvantages and attains the advantages of the last-mentioned process.

About six parts of finely-ground porcelain, earthenware, or similar well-fired composition are mixed with one part of burnt plaster-of-paris and one part of a suitable flux, the quality of which must be determined by the temperature at which the article is to be subsequently fired. The result is worked up after the manner of plaster-of-paris and may then be cast in molds in the same way as this plaster. This composition hardens, like plaster-of-paris, to a perfectly hard mass, which may be easily worked, does not contract while drying, nor shrink when fired to any noticeable extent. It forms a hard porcelain-like body when fired and at a much lower temperature than is the case with clay, earthenware, or porcelain. These properties of the composition are easily explained. The amount of gypsum employed is quite sufficient to bind the mass, and it combines with the flux when the article is fired. The main body of the composition consists of materials which have been already fired, and consequently do not shrink on being again fired, and are evenly and firmly cemented together by the comparatively small amount of flux employed. If, for instance, the flux consists of glaze which melts, say, at 1000° centigrade, which is strong enough for all ordinary purposes, a perfectly durable hard material will be attained at this temperature.

The fact that the composition may be cast in molds in the same manner as plaster-of-paris enables the same free working of the mass and in consequence the same artistic freedom in the application of the same as is the case with plaster-of-paris, its application being just as simple and cheap.

In some cases, when it is not required to fire the composition very sharply, it is advantageous to treat the same with water-glass or other silicate solution, in which process the object in question is allowed to remain in the solution from two to eight days. This latter step should not be mistaken for the known process of saturating the wares with water-glass by coating the same therewith. In this latter case the water-glass is decomposed by the carbonic acid of the air, carbonate of soda or potassium being formed and silicic acid being freed. The carbonate of soda, which is formed in considerable quantities if the coating is repeated often, gives rise to salty excretions and sweating, which is very disadvantageous under certain circumstances. According to the present process the article is immersed in the silicate after the firing has been effected, and if perfectly anhydrous plaster-of-paris has been employed silicate of lime and sulfate of soda will be formed. The silicate of lime will be deposited in the pores in the form of an impervious mass, rendering the composition harder and more compact, while the sulfate of soda or potassium will remain in the solution. After having been washed for a short time in clean water the mass will only contain fired or burnt materials having their pores filled up with silicate of lime and containing no substances capable of sweating out subsequently.

The process once much resorted to of saturating plaster-of-paris with water-glass is quite different in its effects from the above-described methods. Cast or set plaster-of-paris, which retains the water added to harden it in the form of water of crystallization, does not decompose when saturated with or dipped in water-glass solutions. A thin superficial coating of silicate of lime is formed which excretes considerable quantities of the so-called "hair-salt." The plaster-of-paris remains undecomposed in the interior of the mass. A silicifying of the whole mass does not take place.

I claim as my invention—

1. A process for producing a ceramic composition which consists in mixing six parts of finely-powdered fired porcelain, earthenware or the like, with one part of plaster-of-paris, one part of a flux, which fuses at a comparatively low temperature, molding the composition thus produced and firing same substantially as described.

2. A process for producing a ceramic composition which consists in mixing about six parts of finely-powdered fired material such as porcelain, earthenware and the like, with about one part of plaster-of-paris and one part of a flux as specified, firing the whole after molding the figure to be produced and finally immersing the said figure in a silicate bath in the manner and for the purpose substantially as described.

In testimony whereof I have signed this specification in the presence of two subscribing witnesses.

CARL C. SCHIRM.

Witnesses:
W. HAUPT,
HENRY HASPER.